United States Patent [19]
Messerly et al.

[11] Patent Number: 5,056,888
[45] Date of Patent: Oct. 15, 1991

[54] SINGLE-MODE, SINGLE-POLARIZATION OPTICAL FIBER

[75] Inventors: Michael J. Messerly, St. Paul, Minn.; James R. Onstott, Hudson, Wis.; Raymond C. Mikkelson, St. Paul, Minn.

[73] Assignee: Minnesota Mining and Manufacturing Company, Saint Paul, Minn.

[21] Appl. No.: 381,038

[22] Filed: Jul. 17, 1989

[51] Int. Cl.$^5$ .............................................. G02B 6/22
[52] U.S. Cl. ..................................... 385/123; 385/126
[58] Field of Search ........................... 350/96.30, 96.33

[56] References Cited

U.S. PATENT DOCUMENTS

| | | | |
|---|---|---|---|
| 4,354,736 | 10/1982 | Maklad et al. | 350/96.30 X |
| 4,480,897 | 11/1984 | Okamoto et al. | 350/96.30 |
| 4,493,530 | 1/1985 | Kajioka et al. | 350/96.30 X |
| 4,515,436 | 5/1985 | Howard et al. | 350/96.30 X |
| 4,717,225 | 1/1988 | Feth et al. | 350/96.30 X |
| 4,896,942 | 1/1990 | Onstott et al. | 350/96.33 |
| 4,913,521 | 4/1990 | Tajima et al. | 350/96.33 |

FOREIGN PATENT DOCUMENTS 88311448.0  12/1988  European Pat. Off. .

OTHER PUBLICATIONS

Brochure entitled "York Fiber Polarizer" from York V.S.O.P., Burbank, CA (Jun. 1987).

Varnham et al., "Single-Polarisation Operation of Highly Birefringent Bow-Tie Optical Fibres," *Electronics Letters*, vol. 19 (1983) 679-680.

J. R. Simpson, R. H. Stolen, F. M. Sears, W. Pleibel, J. B. Macchesney and R. E. Howard, "A Single-Polarization Fiber," *Journal of Lightwave Technology*, vol. Lt-1, No. 2 (Jun. 1983) 370-374.

J. R. Simpson, R. H. Stolen, W. Pleibel, A. J. Ritger and H. T. Shang, "Properties of Rectangular Polarizing and Polarization Maintaining Fiber," *Proc. SPIE*, vol. 719 (1986) 220-225.

R. H. Stolen, W. Pleibel, J. R. Simpson, W. A. Reed and G. Mitchell, "Short W-Tunnelling Fibre Polarisers," *Electronics Letters*, vol. 24, No. 9, (Apr. 28, 1988) 524-525.

Katsunari Okamoto, Toshihito Hosaka and Juichi Noda, "High-Birefringence Polarizing Fiber with Flat Cladding," *Journal of Lightwave Technology*, vol. Lt-3, No. 4 (Aug. 1985) 758-762.

Katsunari Okamoto, "Single-polarization Operation in Highly Birefringent Optical Fibers," *Applied Optics*, vol. 23, No. 15 (Aug. 1, 1984) 2638-2641.

J. R. Onstott, L. J. Donalds, and R. C. Mikkelson, "Polarization Controlling Optical Fibers," *SPIE*, vol. 719, Fiber Optic Gyros: 10th Anniversary Conference, Bellingham: SPIE 1986.

*Primary Examiner*—John D. Lee
*Assistant Examiner*—Phan T. Heartney
*Attorney, Agent, or Firm*—Gary L. Griswold; Walter N. Kirn; Stephen W. Buckingham

[57] ABSTRACT

A single-mode, single-polarization optical fiber ("PZ fiber") can have a large single-polarization wavelength bandwidth when $\eta$ (as herein defined) for one symmetry axis is positive when calculated from the refractive index profile determined with one of two orthogonal orientations of polarized light and is negative when calculated from the refractive index profile determined with the other orientation, and for each other symmetry axis of the novel optical fiber $\eta$ is positive for both orientations of plane polarized light. Preferably the absolute values for $\eta$ when positive and $\eta$ when negative are about equal for said one symmetry axis. A preferred PZ fiber can be formed by depositing siliceous layers onto the interior surface of a hollow substrate tube of quartz to provide a preform. After forming two parallel flat faces in its outer surface, the preform is pulled to form a PZ fiber having an ellipitcal stress-applying region.

11 Claims, 3 Drawing Sheets

SINGLE-MODE, SINGLE-POLARIZATION OPTICAL FIBER

BACKGROUND OF THE INVENTION

1. Field of the Invention

The invention concerns an optical fiber that propagates only one polarization state of the fundamental mode and so can be used to polarize light or to propagate polarized light over long distances.

2. Description of the Related Art

At the present time, when it is necessary to polarize light for transmission through single-mode optical fibers, this is usually done with either a bulk optic polarizer or an integrated optical polarizer, both of which are quite expensive and undesirably large for many optical fiber applications.

In the mid 1980's, York Technologies introduced a polarizer based on a single-mode, single-polarization optical fiber that has been tightly coiled and supplied in a sealed housing. The coiling results in a bending loss which, in combination with stress-induced birefringence, causes one polarization to be attenuated while the orthogonal state propagates down the fiber core. Because the York device has a rather narrow bandwidth, it must be matched with any single-mode optical fiber with which it is used. A York brochure marked 6/87 (apparently June 1987) reports a bandwidth of at least 20 nm. A publication by the developers of the York device indicates that the optical fiber of the York polarizer has an asymmetric stress-applying region of a cross-sectional geometry resembling a bow-tie and "a depressed index giving a W index profile in one direction", i.e., an index of refraction profile in the shape of a W. See Varnham et al.: "Single Polarization Operation of Highly Birefringent Bow-Tie Optical Fibres," Elec. Lett., Vol. 19, pp. 679–680 (1983).

FIGS. 1, 3, and 5 of U.S. Pat. No. 4,515,436 (Howard et al.) showing three single-mode, single-polarization optical fibers that also have a depressed index or W index profile, and more specifically "the refractive index of an outer cladding region is greater than the refractive index of an inner cladding region but less than that of the core region" (Abstract). Operation at an intermediate wavelength allows the fiber to act as a polarizer. Howard says in connection with FIGS. 1 and 2:

"The birefringence decreases with distance from core 10 so that maximum bandwidth requires a large inner cladding 12. However, this inner cladding region 12 should be narrow for rapid tunneling loss of the undesired polarization. Therefore, a trade-off exists between providing rapid tunneling loss and providing a large bandwidth" (col. 4, lines 18–25).

Although the Howard optical fiber can act as a polarizer without being coiled or otherwise bent, the embodiment of FIG. 5 was bent into four turns with a 1.5 cm bending radius to obtain the transmission data of FIG. 6 which indicates a bandwidth of about 25 nm at 570 nm.

Simpson et al.: "A Single-Polarization Fiber, J. of Lightwave Tech, Vol. LT-1, No. 2 (1983) describes "A single-polarization fiber which uses a combination of high stress-induced birefringence combined with a depressed or W-type cladding structure. . . . The depressed cladding provides a tunneling loss which increases rapidly with wavelength. The anisotropic stress created by a highly-doped elliptical cladding splits the mode-effective indexes so that the cutoff wavelength differs for the two polarizations. Bandwidths of 8 percent are achieved for fibers with core sizes and refractive indexes typical of single-mode transmission fibers. Extinction ratios of more than 30 dB with less than 1-dB insertion loss have been obtained with fiber lengths on the order of 1 m. The wavelength of useful operation can be tuned by bending the fiber" (page 370).

See also Simpson et al.: "Properties of Rectangular Polarizing and Polarization Maintaining Fiber," Proc. SPIE, Vol. 719, pp. 220–225 (1986) which says that a polarizing fiber of substantially rectangular shape with a W-type index profile had provided greater than 30 dB of extinction ratio at a length of 5 cm, with a modal birefringence which separates the orthogonal polarization mode cutoff wavelengths by 0.1 um.

A "W-tunneling fiber polarizer" is held straight for testing in Stolen et al.: "Short W-Tunneling Fibre Polarizers," Elec. Lett., Vol. 24, pp. 524–525 (1988) which indicates a bandwidth of about 25 nm at 633 nm to achieve 39 dB polarization. Unfortunately, the bandwidth of about 25 nm of Stolen and some of the other above-discussed publications, leaves little margin for manufacturing error. For example, it is difficult to build a narrow-bandwidth semiconductor light source (e.g., a laser) to a precise operating wavelength. Also, shifts in bandwidths could be expected in a series of optical fibers made to duplicate the Stolen or other prior optical fiber polarizers. Furthermore, variations in conditions of use could result in occasional mismatching of wavelengths even if a laser and a polarizer had been initially matched.

Okamoto et al.: "High-Birefringence Polarizing Fiber with Flat Cladding," J. of Lightwave Tech., Vol. LT-3, No. 4, pp. 758–762 (1985) remarks that the Varnham publication shows "that the polarizing effect can be enhanced when the birefringent fiber is bent with the fast axis oriented parallel to the plane of the fiber coil." Okamoto's fiber, which has a depressed or W index-/profile along the x-axis (slow axis) has flats that are parallel to its slow axis. When the fiber is coiled, the flats keep the slow axis parallel, and this produces substantially broader bandwidths. FIG. 9 of Okamoto shows that a bandwidth of 390 nm can be attained at a bending diameter of 4.5 cm. See also Okamoto et al.: "Single-Polarization Operation of Highly Birefringent Optical Fibres," Applied Optics, Vol. 23, No. 15, pp. 2638–2641 (1984) and U.S. Pat. No. 4,480,897 (Okamoto et al.).

SUMMARY OF THE INVENTION

The invention provides what is believed to be the first single-mode, single-polarization optical fiber which (without being bent) has a sufficiently large single-polarization wavelength bandwidth to permit it to be manufactured without the need for careful matching to specific narrow-bandwidth light sources. In other key respects, the single-mode, single-polarization optical fiber of the invention is at least equal to prior single-polarization optical fibers, namely, in satisfactorily high extinction coefficient of the tunneling polarization state and in minimal attenuation of the propagating polarization state.

Briefly, the single-mode, single-polarization optical fiber of the invention, like those of several of the above-cited publications, incorporates an asymmetric stress-applying region which causes the fiber to be birefringent. Also like those prior fibers, that of the invention has along at least one of its axes of symmetry a depressed refractive index profile, that is, the core is separated from the cladding by an intermediate region whose refractive index is less than that of either the core or the cladding.

To see how the novel single-polarization optical fiber (sometimes here called "PZ fiber") of the invention differs from prior single-polarization fibers, consider a pair of refractive index profiles from a single symmetry axis of the optical fiber, measured with plane polarized light that is aligned to be either parallel to, or perpendicular to, the chosen symmetry axis. The parameter $\eta$ is calculated from each such profile by the expression $$\eta = \int_0^\infty [n(r) - n_{cl}] r^\alpha dr$$

where n(r) represents the refractive index at the radial position r measured along said symmetry axis and with one of the two said orientations of polarized light; $n_{cl}$ is the average refractive index of the cladding over a distance from 4 to 7 core radii from the core center, and is considered to extend to infinity; and $\alpha$ has a value between 0 and 1, with its precise value determined by the shape of the core and the cladding. When both the core and cladding are circular, $\alpha$ is 1; when the core and cladding are so elongated that the fiber behaves essentially as a planar waveguide, $\alpha$ approaches 0; and for intermediate shapes, $\alpha$ is between 0 and 1.

The novel single-polarization optical fiber of the invention differs from prior single-polarization fibers in that $\eta$ for one symmetry axis is positive (greater than 0) when it is calculated from the refractive index profile determined with one of the two said orientations of polarized light and is negative (less than 0) when it is calculated from the refractive index profile determined with the orthogonal orientation of polarized light. The parameter $\eta$ for each other symmetry axis of the novel optical fiber is positive for both orientations of plane polarized light.

The polarization state that results in a positive value of $\eta$, this value subsequently referred to as $n_g$, is guided for all finite wavelengths of light neglecting losses caused by bending and absorption. The polarization state that results in a negative value of $\eta$, this value subsequently referred to as $n_t$, tunnels out of the fiber waveguide at all wavelengths of light longer than some finite wavelength. For fibers of the invention, then, the wavelength bandwidth over which one and only one polarization state of light propagates is large, neglecting losses of the guided state caused by bending and absorption. The tunneling criterion is derived for an analogous problem in Simon, "The Bound State of Weakly Coupled Schröedinger Operators in One and Two Dimensions," *Annals of Physics*, 97, pp 279-288 (1976).

Preferably the positive and negative values of $\eta$ for said one symmetry axis have about equal absolute values, because this should maximize the manufacturing tolerance of the novel single-polarization fiber.

Another test for determining whether a single-mode optical fiber is useful in the present invention employs the parameter $\chi$ as given by the expression $$\chi = \frac{\eta_g + \eta_t}{\eta_g - \eta_t}$$

For an optical fiber of the invention, $\chi$ is between $-1$ and $+1$ for one symmetry axis with the preferred value $\chi=0$. For each other symmetry axis $\chi$ is outside said range. The value of $\chi$ decreases as the birefringence increases. Hence, a large birefringence increases manufacturing tolerances. The birefringence should also be large to lessen the effect of environmentally-induced birefringence on the fiber's performance.

DETAILED DISCLOSURE

For a given symmetry axis, we find that the birefringence is essentially constant over the regions interior to the stress-applying region. The fact that the birefringence is not confined to the fiber core appears to have no deleterious effect on the fiber's performance; the criteria listed in the invention summary can still be met, and we find that the wavelength bandwidth over which the fibers polarize is large.

To increase the attenuation rate of the tunneling state in a step index, W-type fiber, the ratio of the diameter of the intermediate region to the diameter of the core should be made as small as possible. As this ratio is made small, either the index difference between the intermediate region and the cladding must be increased, or the index difference between the core and the cladding must be decreased, in order to maintain said desired balance between $\eta_g$ and $\eta_t$. The index difference between the core and the cladding must also be chosen to achieve the desired cutoff wavelength of the tunneling state, and this cutoff wavelength can be calculated for a circularly symmetric fiber using well known relationships (see, for example, M. Monerie, "Propagation in Doubly Clad Single-Mode Fibers," *IEEE J. Quantum Electron.*, Vol. QE-18, no. 4, p. 535 (1982)).

It may be feasible to optimize the dispersion or the bend tolerance of the novel optical fiber by employing two or more materials of differing index of refraction in the intermediate region, and the index of refraction of one or more of those materials can exceed $n_{cl}$.

A preferred PZ fiber of the invention can be formed by depositing siliceous layers onto the interior surface of a hollow substrate tube of quartz. Even though quartz is silica, commercially available hollow substrate tubes contain impurities that would make it difficult to deposit heavily doped silica. Hence, it is desirable for the first siliceous layer to be pure silica or lightly doped silica to provide what is here sometimes called "an outer barrier" and its refractive is $n_{cl}$.

When the first layer is pure or lightly doped silica, the next layer to be deposited can form a stress-applying region and preferably is doped to have a refractive index less than $n_{cl}$. Over this is deposited a layer that can form what is here called "an intermediate region" and preferably is doped to have a refractive index about equal to that of the stress-applying region, thus assuring that the guided state will not be cut off at too short a wavelength. The final layer can form the core of the PZ fiber.

After collapsing the coated substrate tube to provide a preform, two diametrically opposed parallel flat faces are ground into the outer surface of the preform. Upon pulling the ground preform to form the PZ fiber, the outer surface of the PZ fiber becomes cylindrical, and the stress-applying region becomes elliptical.

Instead of grinding flat faces into the preform, the preform can be flattened and drawn while so controlling the temperature to produce a PZ fiber of the invention, the outer surface of which is substantially elliptical like that of FIG. 5 of Howard. The PZ fiber of the invention can have other forms, e.g., a PANDA configuration like that illustrated in the above-cited Okamoto publication or a bow-tie configuration.

The stress-applying region of the novel PZ fiber preferably is doped to have the same index of refraction as that of the intermediate region, thus minimizing any tunneling of the guided state. The index of refraction of the stress-applying region can be matched to that of the intermediate region by co-doping $B_2O_3$ doped silica with $GeO_2$. By also doping it with $P_2O_5$, the temperature at which the stress-applying region is deposited can be lowered, but the presence of phosporous sometimes causes fibers to be degraded upon exposure to ionizing radiation.

Preferably, the core of the novel PZ fiber is silica doped with germanium oxide, and the intermediate region is silica doped with fluorine. By also including $P_2O_5$ in the intermediate region, the temperature at which it is deposited can be lowered, again at the possible expense of degradation upon exposure to ionizing radiation.

When the novel PZ fiber contains phosphorous, it may be desirable for its outer barrier to be silica doped with both $P_2O_5$ and F, the former dopant lowering its deposition temperature, and the latter offsetting the change in index of refraction that otherwise would result from the presence of the phosphorous.

When the novel PZ fiber has an elliptical stress-applying region, its minor diameter preferably is from 20% to 40% of its major diameter. At greater than 40%, the stress-applying region might not produce the desired degree of stress on the core, whereas at less than 20%, the major diameter of the stress-applying region would necessarily be quite large to permit the inner cladding to have adequate thickness.

To be compatible with sensor fibers now on the market, the novel PZ fiber produced by the above-outlined method can be drawn to any diameter, e.g., 80 μm for operation at 850 nm and 125 um for operation at 1300 nm.

THE DRAWING

The invention may be more easily understood in reference to the drawing.

Figure 1:
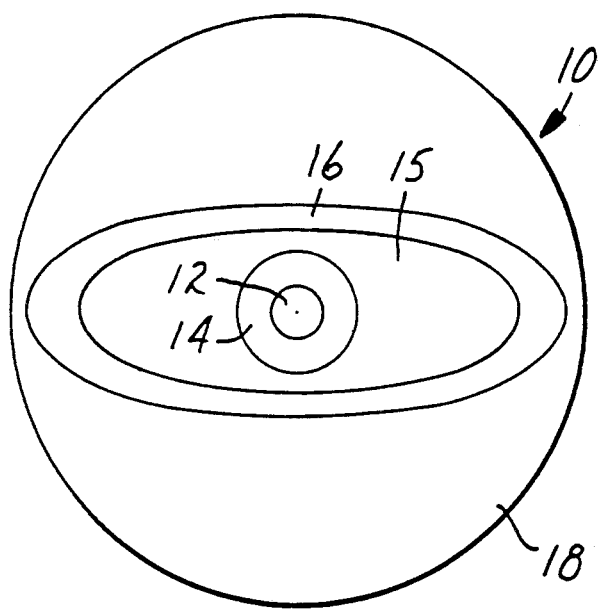
FIG. 1 is a schematic cross section through a preferred single-mode, single-polarization optical fiber of the invention.

The optical fiber 10 of FIG. 1 has been made using a hollow substrate tube by the above-outlined method. The deposited layers have produced a core 12 of circular cross section, an intermediate region 14, and an outer cladding region that includes an elliptical stress-applying region 15 and an elliptical outer barrier 16. The outer cladding region also includes a jacket 18 that has been provided by the hollow substrate tube.

Figure 2A:
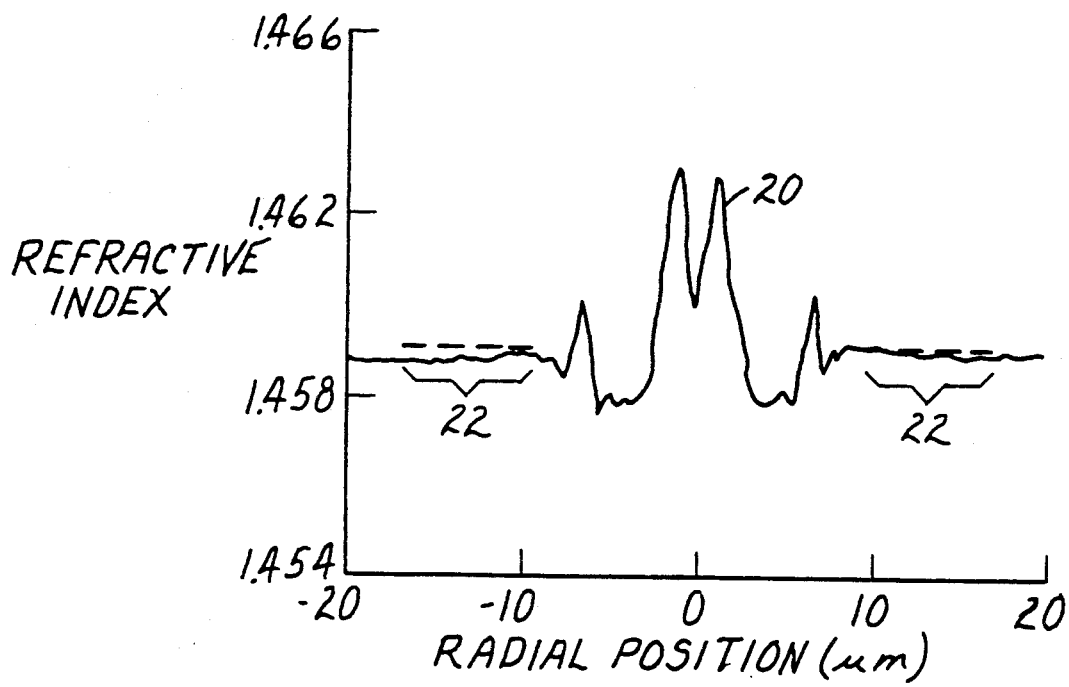
FIGS. 2a and 2b are plots, as measured with plane polarized light, of the refractive index versus radial position, of the optical fiber of Example 1.
Figure 2B:
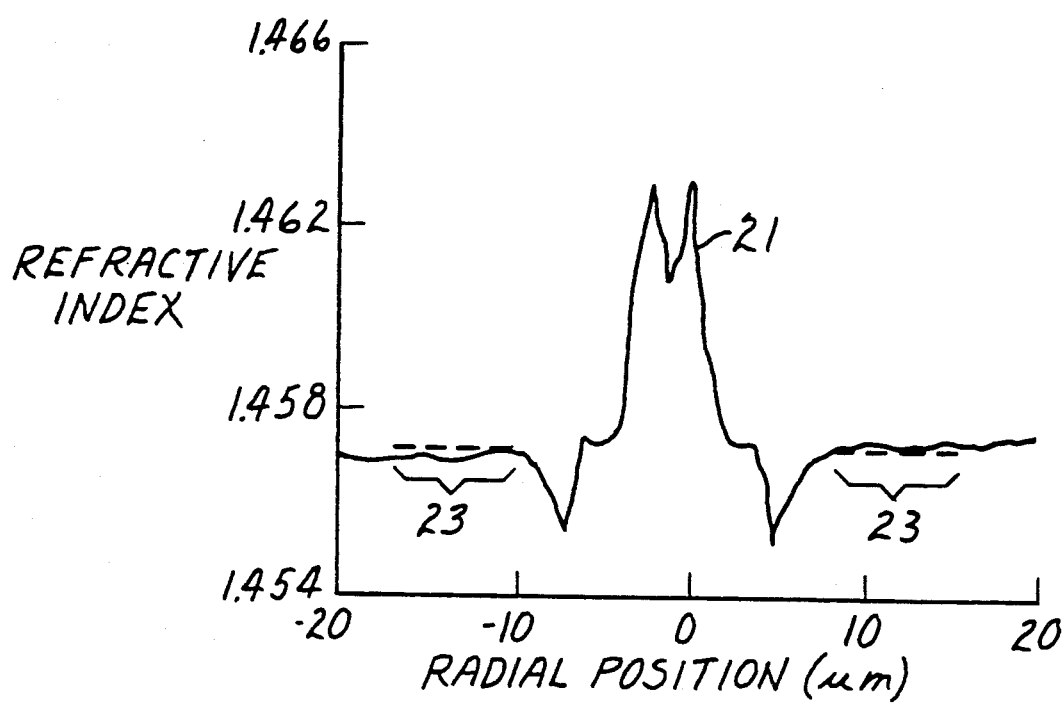

The curves 20 and 21 of FIGS. 2a and 2b respectively are plots of refractive index versus radial position for the example fiber, measured with plane polarized light oriented along the major symmetry axis of the optical fiber. The plots are determined from the minor and major symmetry axes, respectively. The phantom lines 22 and 23 show the refractive index of the cladding.

Figure 3A:
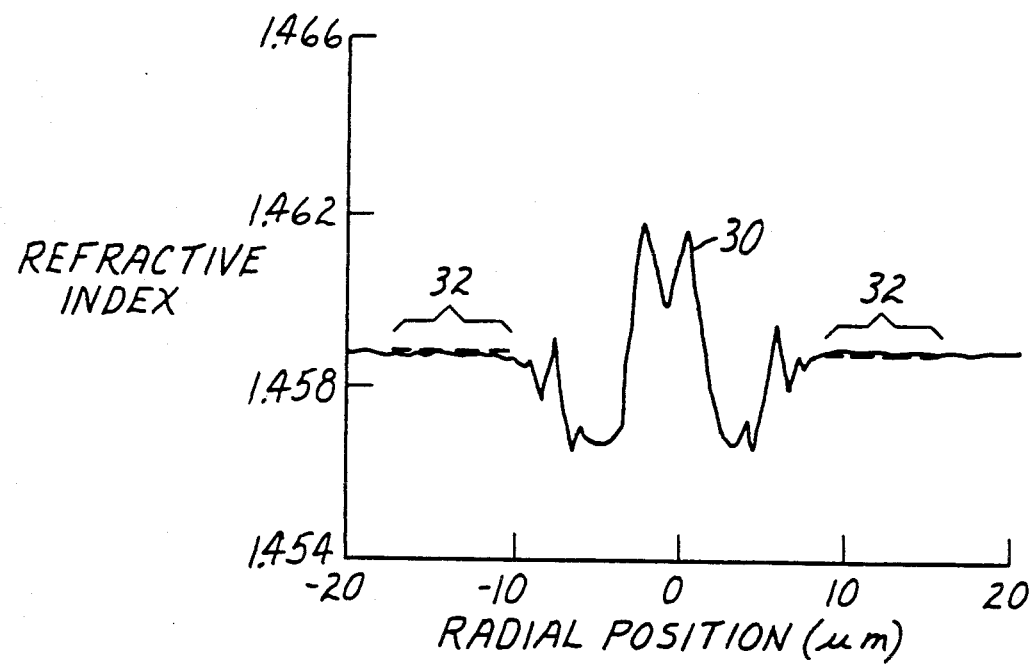
FIGS. 3a and 3b are plots of the refractive index versus radial position measured as in FIGS. 2a and 2b except with plane polarized light that is orthogonal to the orientation of FIG. 2.
Figure 3B:
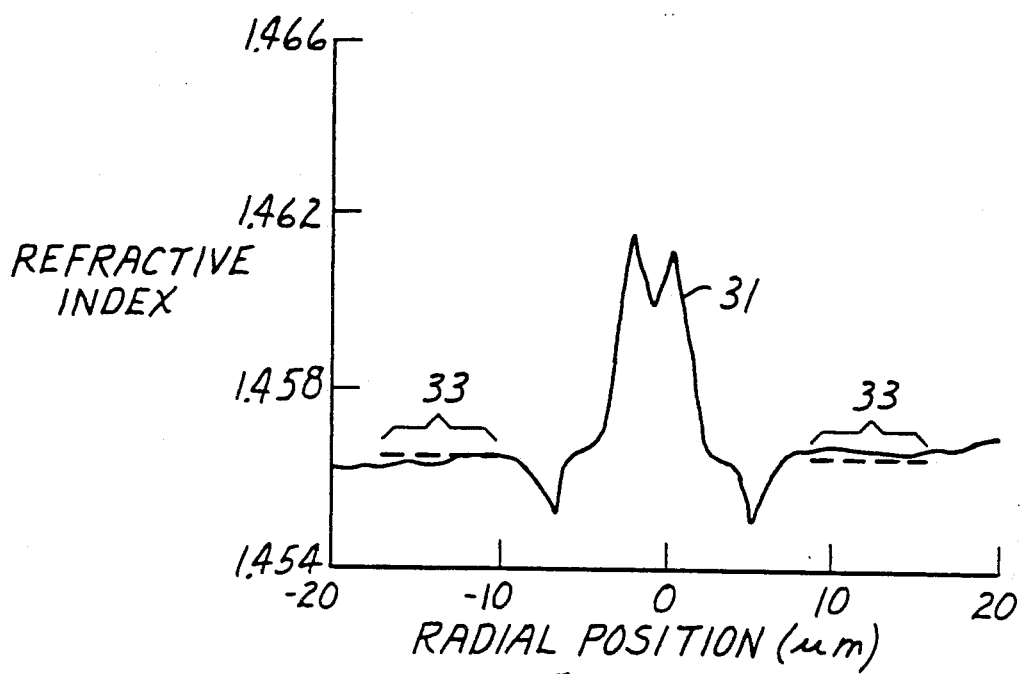

The curves 30 and 31 of FIGS. 3a and 3b respectively are plots of refractive index as in FIG. 2, except with plane polarized light oriented along the minor symmetry axis of the optical fiber. The phantom lines 32 and 33 show the refractive index of the cladding.

Figure 4:
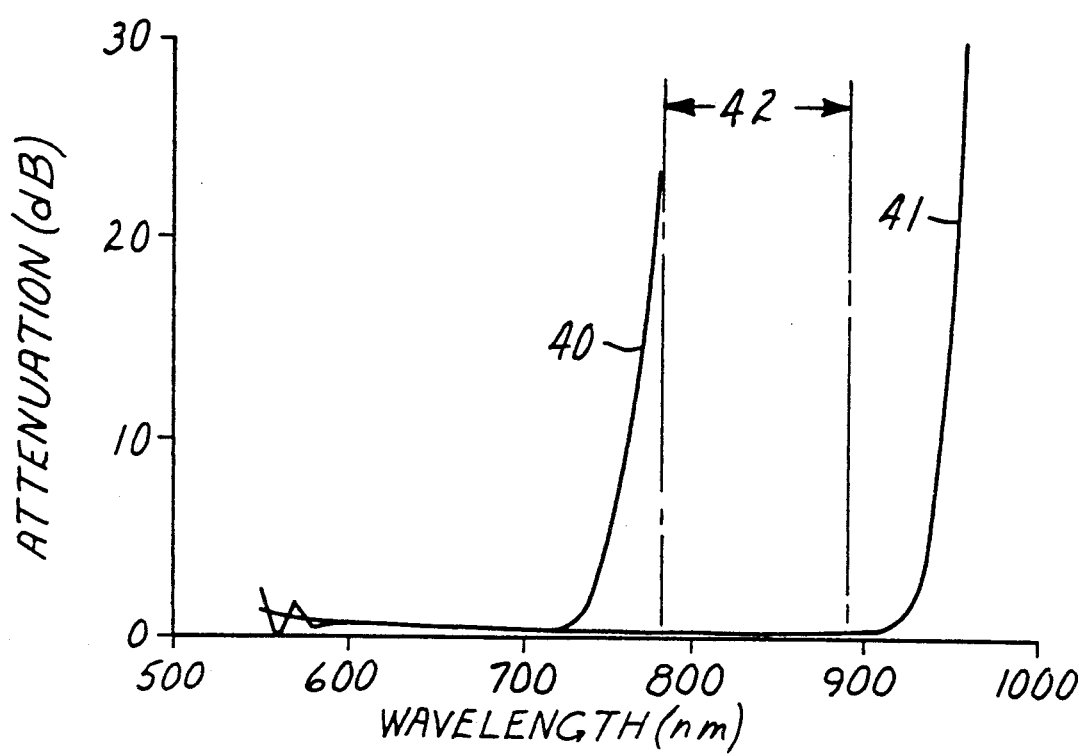
FIG. 4 shows the operating bandwidth of the PZ fiber of Example 1.

The curves 40 and 41 of FIG. 4 are plots of attenuation versus wavelength, measured respectively with the tunneling polarization state and the guided polarization state, on a 42 m length of fiber. The operating bandwidth, 42, is the wavelength band over which the tunneling state is attenuated by at least 30 dB, and the guided state suffers less than 1 dB/km of additional attenuation.

EXAMPLE 1 making a polarization-maintaining optical fiber of the invention

A. Preform Fabrication:

The preform in this example was fabricated by the modified chemical vapor deposition process (MCVD). In this process, glass of controlled composition and thickness is deposited on the inside of a fused silica tube by the chemical reaction of oxygen with metal chlorides or bromides. A more complete description of the process may be found in U.S. Pat. No. 4,217,027 (MacChesney et al.)

A fused silica tube (General Electric #982) with an inside diameter of nominally 17.0 mm and an outside diameter of nominally 20.0 mm was inserted into a deposition apparatus (preform lathe, gas flow system, hydrogen torch). The inside wall of the tube was first etched with fluorine to produce an uncontaminated surface for deposition. Four layers of glass were then deposited onto the inside wall of the tube. The functions and compositions of the four layers are described below.

| Function | Composition |
|---|---|
| Layer-1 Outer barrier | $SiO_2/P_2O_5/F$ |
| Layer-2 Stress-applying region | $SiO_2/B_2O_3/GeO_2/P_2O_5$ |
| Layer-3 Intermediate region | $SiO_2/P_2O_5/F$ |
| Layer-4 Core | $SiO_2/GeO_2$ |

Stepwise conditions are listed in Table I. Temperatures reported in Table I are pyrometer readings of the external surface of the fused silica tube.

TABLE I

| Step | Vapor Flow* (cm³/min) | | | | | | No. of Passes | Temp (°C.) | Speed (mm/min) |
| --- | --- | --- | --- | --- | --- | --- | --- | --- | --- |
| | SiCl₄ | GeCl₄ | POCl₃ | BBr₃ | Freon | O₂ | | | |
| Etch | | | | | 200 | 1000 | 2 | 1750 | 150 |
| Clear | | | | | | 1000 | 1 | 1580 | 150 |
| Layer-1 | 300 | | 83.5 | | 4.5 | 1000 | 5 | 1580 | 150 |
| Clear | | | | | | 1000 | 1 | 1580 | 150 |
| Layer-2 | 300 | 515 | 75 | 1140 | | 2000 | 15 | 1725 | 200 |
| Clear | | | | | | 2000 | 4 | 1725 | 200 |
| Layer-3 | 300 | | 46 | | 15 | 1000 | 3 | 1700 | 150 |
| Clear | | | | | | 1000 | 1 | 1700 | 150 |
| Layer-4 | 50 | 29 | | | | 1000 | 3 | 1750 | 200 |
| Clear | | | | | | 1000 | 1 | 1750 | 200 |

*Vapor flow indicates flow of carrier gas (O₂ for the SiCl₄, GeCl₄, and POCl₃, and Ar for the BB or direct flow of Freon and O₂. Spindle rotation speed is 50 rpm throughout.

After completion of the deposition process, the annular tube with inner deposited layers was collapsed to a non-hollow preform by standard techniques.

B. Preform Shaping:

Two diametrically opposed flat surfaces were ground onto the initially cylindrical preform with a conventional surface grinding machine and a diamond grinding wheel, removing at each flat 2.54 mm radially. Then the preform was thoroughly cleaned to remove any particulate contamination that might result from the grinding procedure.

C. Fiber Draw:

Using a zirconia induction furnace, the preform was drawn into a fiber having a diameter of 75 μm while maintaining a temperature sufficiently high to give the fiber a circular cross-section. The temperature read by the pyrometer that monitored the furnace was 2125° C. As it was drawn, the fiber was coated with two separate acrylate layers that were individually cured with ultraviolet light. The first acrylate coating applied was D1-11 from DeSoto Co., the second was D-100, also from DeSoto Co. The coated fiber was spooled onto a reel.

D. Fiber Properties:

The PZ optical fiber resulting from steps A through C has the following mechanical and optical properties.

| Mechanical properties: | |
| --- | --- |
| Core diameter | 4.9 μm |
| Intermediate region diameter | 12 μm |
| Elliptical stress applying region | |
| major diameter | 59 μm |
| minor diameter | 15 μm |
| Outer barrier | |
| major diameter | 65 μm |
| minor diameter | 17 μm |
| Cladding diameter | 76 μm |
| Acrylate coating diameter | 216 μm |

| Optical properties: | |
| --- | --- |
| Refractive index, measured with circularly polarized light, of | |
| core | 1.462 |
| inner barrier | 1.457 |
| stress-applying region | |
| along major axis | 1.457 |
| along minor axis | 1.4595 |
| outer barrier | 1.459 |
| substrate tube | 1.459 |
| Loss at 850 nm, guided state | 4.7 dB/km |
| Mode field diameter at 850 nm | 5.8 μm |

| -continued | |
| --- | --- |
| Optical properties: | |
| LP-11 cutoff wavelength | <550 nm |
| LP-01 cutoff wavelength, tunneling state | 780 nm |
| Wavelength of 1 dB/km increase in attenuation, guided state | 890 nm |
| Polarizing bandwidth | 110 nm |
| Birefringence at 633 nm | $5 \times 10^{-4}$ |

Because the stress-applying region is asymmetric, the cladding of the PZ fiber is not circular even though the core is circular. Hence, $\alpha$ is between 0 and 1. However, assuming $\alpha$ to be either 0 or 1, from the minor axis

| $\alpha$ | $\eta_l$ | $\eta_g$ | $\chi$ |
| --- | --- | --- | --- |
| 0 | $-0.006$ μm | $0.010$ μm | 0.20 |
| 1 | $-0.056$ μm² | $0.006$ μm² | $-0.80$ | and from the major axis

| $\alpha$ | $\eta_l$ | $\eta_g$ | $\chi$ |
| --- | --- | --- | --- |
| 0 | $0.006$ μm | $0.007$ μm | 10 |
| 1 | $-0.008$ μm² | $-0.009$ μm² | 12 |

Although the novel single-polarization optical fiber has excellent bandwidth when straight, bending or coiling can permit a shorter length of the fiber to polarize light. In any sensor that includes a polarizer with polarization-maintaining optical fiber, those elements should be replacable by the novel single-polarization optical fiber, e.g., in fiber gyroscopes, magnetometers, and current sensors.

What is claimed is:

1. A single-mode, single-polarization optical fiber comprising a core and a cladding including an asymmetric stress-applying region, which fiber has a depressed index of refraction along at least one axis of symmetry and is characterized by the feature that a pair of refractive index profiles from a single symmetry axis of the optical fiber may be measured with plane polarized light that is aligned to be parallel to the chosen symmetry axis for one of said refractive index profiles and perpendicular to the chosen symmetry axis for the other of said refractive index profiles and a parameter and $\eta$ may be calculated from each such profile by the expression $$\eta = \int_0^\infty [n(r) - n_{cl}] r^\alpha dr$$

where n(r) represents the refractive index at the radial position r measured along said symmetry axis and with one of the two said orientations of polarized light; $n_{cl}$ is the average refractive index of the cladding over a distance from 4 to 7 core radii from the core center; and $\alpha$ has a value from 1 when both the core and cladding are circular to nearly 0 when the core and cladding are so elongated that the fiber behaves essentially as a planar waveguide; and $\eta$ for one symmetry axis is positive when calculated from the refractive index profile determined with one of the two said orientations of polarized light and is negative when calculated from the refractive index profile determined with the orthogonal orientation of polarized light, and for each other symmetry axis of the novel optical fiber $\eta$ is positive for both orientations of plane polarized light.

2. A single-mode, single-polarization optical fiber as defined in claim 1 wherein the absolute values for $\eta$ when positive and $\eta$ when negative are about equal for said one symmetry axis.

3. A single-mode, single-polarization optical fiber as defined in claim 1 wherein the stress-applying region is silica doped with $GeO_2$ and $B_2O_3$.

4. A single-mode, single-polarization optical fiber as defined in claim 1 wherein the stress-applying region is also doped with $P_2O_5$.

5. A single-mode, single-polarization optical fiber as defined in claim 1 and further comprising an intermediate region between the core and the asymmetric stress-applying region.

6. A single-mode, single-polarization optical fiber as defined in claim 5 wherein the intermediate region is silica doped with fluorine.

7. A single-mode, single-polarization optical fiber as defined in claim 1 and having an outer barrier of pure silica.

8. A single-mode, single-polarization optical fiber as defined in claim 1 and having an outer barrier of is silica doped with both $P_2O_5$ and F.

9. A single-mode, single-polarization optical fiber as defined in claim 1 wherein said asymmetric stress-applying region is substantially elliptical.

10. A single-mode, single-polarization optical fiber as defined in claim 9 wherein the minor diameter of the stress-applying region is from 20% to 40% of its major diameter.

11. A single-mode, single-polarization optical fiber as defined in claim 1 and having an index profile that is a simple W along at least one symmetry axis.

* * * * *